United States Patent [19]
Griffith

[11] 4,115,233
[45] Sep. 19, 1978

[54] TREATMENT OF AQUEOUS DISPERSIONS

[75] Inventor: Edward J. Griffith, Manchester, Mo.

[73] Assignee: Monsanto Company, St. Louis, Mo.

[21] Appl. No.: 755,117

[22] Filed: Dec. 27, 1976

[51] Int. Cl.$^2$ ............................................. B01D 13/02
[52] U.S. Cl. ................................. 204/180 R; 204/186; 204/299 R; 204/305
[58] Field of Search .................... 204/180 R, 299, 300, 204/301, 305, 186

[56] References Cited

U.S. PATENT DOCUMENTS

| | | | |
|---|---|---|---|
| 2,406,820 | 9/1946 | Fisher et al. | 204/300 X |
| 2,448,848 | 9/1948 | Van Loenen | 204/300 |
| 3,197,394 | 7/1965 | McEuen | 204/300 X |
| 4,001,100 | 1/1977 | Haydock | 204/180 R |
| 4,003,819 | 1/1977 | Kunkle et al. | 204/301 |
| 4,048,038 | 9/1977 | Kunkle | 204/180 R |

*Primary Examiner*—Arthur C. Prescott
*Attorney, Agent, or Firm*—A. E. Hoffman

[57] ABSTRACT

The zonal concentration of solids in an aqueous dispersion is increased through the use of electroendosmosis. In the aqueous dispersion, a first cathode means, an anode means, spaced from the first cathode means, a second cathode means, intermediate the first cathode means and the anode means, and means for establishing a direct current electrical potential between the first and second cathode means and the anode means, is provided wherein electroendosmosis may be used to increase the density of solids within aqueous dispersions covering areas greater than twelve meters in diameter.

11 Claims, 3 Drawing Figures

TREATMENT OF AQUEOUS DISPERSIONS

BACKGROUND OF THE INVENTION

This invention relates to a process for increasing the rate of zonal concentration and final density of solids in an aqueous dispersion of such solids and to apparatus for the practice of such process.

In many industrial processes, aqueous dispersions of solids are obtained as waste streams. For example, washing of ores, scrubbing of gas streams, precipitation of impurities, sewage disposal, etc., often produce waste streams referred to industrially as tailings, mud, etc. Such waste streams often cannot be conveniently disposed of due to materials handling difficulties or ecological or safety considerations. Therefore, it is a common practice to retain such wastes in large ponds, holding tanks, or other containment means. To the extent the solids in the retained dispersions can be zonaly concentrated by settling, floatation, etc., to provide a relatively solids-free aqueous phase which can be sewered or otherwise disposed of following any necessary filtration or purification procedures, space is provided in the containment means for retention of additional waste. However, in the case of many aqueous dispersions, zonal concentration of the solids by settling takes place at an extremely low rate, if at all. Thus, periodic construction of additional containment means at great difficulty and expense becomes necessary. Numerous attempts have been made at increasing the rate of zonal concentration of solids in such dispersions. However, the use of conventional means such as filtration, settling aids, or the like, is frequently physically impossible or prohibitively expensive. It has been found that laboratory techniques for effecting zonal concentration of solids in aqueous dispersions often cannot be successfully applied to large scale industrial waste retention systems. For example, it is known that applying an electrical potential between electrodes placed in an aqueous dispersion will cause migration of water towards the cathode to effect zonal concentration of solids via electroendosmosis. However, in large systems where the anode and cathode must, as a practical matter, be separated by relatively great distances, large and non-linear voltage drops occur which prevent effective application of the electroendosmotic technique.

It is thus well recognized that practical means for promoting zonal concentration of solids in aqueous dispersions have long been desired by those skilled in the art.

SUMMARY OF THE INVENTION

It is an object of this invention to provide a process for increasing the rate of zonal concentration and final density of solids in aqueous dispersions containing such solids. In particular, it is an object of the invention to provide such a process suitable for use in large scale dispersion retention systems. A further object of the invention is to provide apparatus suitable for use in said process.

The objects of this invention are obtained by positioning electrodes in critically spaced relationships as hereinafter defined in aqueous dispersions of the type discussed and applying a direct current electrical potential between the electrodes to effect zonal concentration of solids via electroendosmosis. The practice of this process and the apparatus employed therein will be understood from the following description of the preferred embodiments.

DESCRIPTION OF THE PREFERRED EMBODIMENTS

Figure 1:
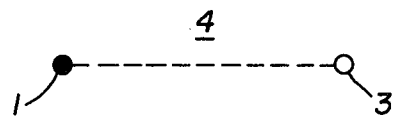
Figure 2:
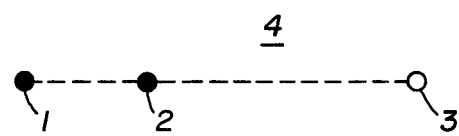
Figure 3:
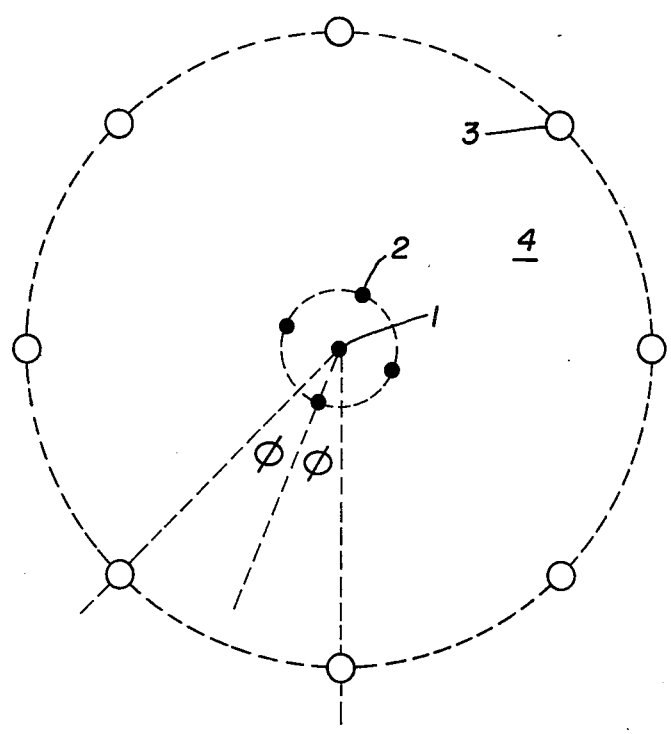

The process and apparatus of the present invention apply for use on aqueous dispersions contained in large (greater than 100 square meter area) impoundments, in which the dispersed particles are characterized by having an electrical charge in relation to ground zero. The greatest practical advantages of the invention are obtained with systems wherein zonal concentration of solids by natural settling does not rapidly occur to a high density.

In the practice of the present invention, electrodes are positioned within the aqueous dispersion as hereinafter described and a direct current electric potential is applied to effect zonal concentration of the solids via electroendosmosis. The dispersed particles within the hereinafter described aqueous dispersions may be characterized as having a negative electrical charge in relation to ground zero.

The critical spacing of electrodes required in the present invention is described by reference to the drawings in which FIG. I is a schematic top view of an electrode arrangement as employed in previously known electroendosmosis techniqes in which a first cathode means 1 and an anode means 3 are disposed in an aqueous dispersion of solids 4.

FIG. II is a schematic top view of an electrode arrangement used in the practice of the present invention wherein a first cathode means 1, a second cathode means 2, and an anode means 3 are disposed in an aqueous dispersion of solids 4.

FIG. III is a schematic top view of a more preferred arrangement of electrodes according to the present invention wherein a first cathode means 1, a plurality of second cathode means 2, and a plurality of anode means 3 are disposed in an aqueous dispersion of solids 4.

It has long been recognized that an electrode arrangement as shown in FIG. I can be used to effect migration of water in an aqueous dispersion towards a cathode means 1 so long as the cathode means 1 and anode means 3 are separated by relatively small distance. However, when the distance between the cathode means 1 and anode means 3 is greater than a few feet, a large voltage drop occurs in close proximity to the cathode and anodes and a smaller drop per linear feet more distant from the electrodes which prevents effective application of the electroendosmosis principal. In general, electroendosmosis techniques cannot be practically employed for increasing the rate of zonal concentrations in aqueous dispersions in systems wherein the voltage drop over any 5% of the linear distance between the cathode and anode is greater than 30% of the total voltage drop between the cathode and anode. Where the 5% rule is violated, large percentages of energy are wasted in the form of heat and the electroendosmosis system ceases to function properly.

In accordance with the present invention, it is unexpectedly found that proper positioning of the second cathode means 2 between the first cathode means 1 and anode means 3 as shown in FIG. II will prevent the occurrence of unduly large voltage drops across small linear distances and will allow electroendosmosis techniques to be used in large impoundments.

In accordance with the present invention, the first cathode means 1 and the anode means 3 are separated by a distance sufficiently great that if the second cathode means 2 were relocated so that the first and second cathode means 1 and 2 were closely adjacent and the same distance from the anode means 3, and if a direct current electric potential sufficient to effect preferential migration of water in the dispersion toward the cathodes were imposed, the voltage drop over any 5% of the linear distance between the cathodes and anodes would be greater than 30% of the total voltage drop between the cathodes and anodes. If the first cathode means 1 is located closer to the anode means 3, the advantage provided by the present invention is substantially reduced or eliminated. In the treatment of most aqueous dispersions, the maximum advantages of this invention are obtained wherein the first cathode means 1 is separated from the anode means 3 by a distance of at least about six meters.

In the practice of the present invention, the second cathode means 2 will be positioned closer to the first cathode means 1 than to the anode means 3 and will be disposed on a plane perpendicularly transversing the plane between the first cathode means 1 and the anode means 3. The anode means 3 and second cathode means 2 each are comprised of a plurality of electrodes which are preferably positioned within the impoundment 4 in the form of two concentric circles about the first cathode means 1. The plurality of anodes comprising the anode means 3 is positioned such that each anode is equally spaced from its adjacent anodes. Similarly, the plurality of cathodes comprising the second cathode means 2 is positioned such that each cathode is equally spaced from its adjacent cathodes. The electrodes will be arranged such that a line drawn from the central cathode 1 through a cathode of the second cathode means 2 will bisect the angle formed by lines drawn between the central cathode 1 and alternate pairs of adjacent anodes of the anode means 3. Thus, in FIG. III the angles $\phi$ are all equal. Each electrode is anchored in its preferred position by a large weight which is attached by a nonconducting nylon rope. The relative spacing of the first cathode means 1, the second cathode means 2, and the anode means 3 will be such that when the potential chosen to effect electroendosmotic migration of water towards the first and second cathode means 1 and 2 is applied that no 5% of the linear distance between the first and second cathode means 1 and 2 and anode means 3 will exhibit a voltage drop greater than 30% of the total voltage drop between the first cathode means 1 and anode means 3. The optimum positioning of the electrodes, particularly the second cathode means 2, for particular aqueous dispersions and applied electrical potentials can be readily determined by routine testing.

The maximum distance by which the anode means 3 can be spaced from the first cathode means 1 is limited only by the maximum distance at which required control of voltage drop can be obtained by proper positioning of the second cathode means 2 and, as a more practical matter, the distance at which electroendosmosis can be induced by application of reasonable electric potentials. As a practical matter, spacings between the first cathode and anode greater than sixty meters will rarely be employed.

It will be recognized by those skilled in the art that the permissible and optimum spacings of electrodes will be dependent upon the characteristics of the aqueous dispersion of solids, electrode design, and electric power sources available. However, as previously mentioned, for any given dispersion, electrode design, and electric power source permissible and optimum spacings within the limitations above set forth can be readily determined by routine tests.

The materials employed for the cathodes are not critical and any electrically conductive material can be employed. Preferably, the materials employed for cathode construction will be relatively resistant to chemical attack by the constituents of the aqueous dispersion. However, the cathode may be relatively light in weight as they, unlike the anodes, will not be decomposed electrically. The anodes are preferably largely iron. Iron is preferred as an inexpensive metal which is easily decomposed to form iron-oxide.

The design of the individual electrodes must also be considered. It is generally preferred to use elongated electrodes of relatively small cross-sectional area. The electrodes could, for example, be formed from bar stock or I-beams, and railroad rails are particularly well suited. For longer operating times solid rods are preferred over hollow pipe because a greater mass is present for decomposition.

Preferred systems will employ a plurality of second cathodes spaced around a centrally located first cathode and a plurality of anodes spaced around the cathode system as shown in FIG. III. Such an arrangement permits optimization of electric fields in the system and effectively subjects large areas of the aqueous dispersion to the electroendosmotic effect.

For reasons of safety, it is desirable that the cathodes and anodes be totally submerged in the aqueous dispersion.

The arrangement of electrodes has been discussed relative to systems wherein the electrodes are laterally spaced. However, depending upon the characteristics of the aqueous dispersion and the containment means within which it is held, it may in some instances be desirable to employ vertically spaced electrode systems or combinations of vertically and horizontally spaced electrode systems. It is generally desirable that the anodes be disposed at a depth somewhat greater than the depth of the cathodes when water is removed from aqueous dispersions of negatively charged particles in order to promote concentration of the solids towards the bottom of the containment means in which they are confined. An example of vertical spacing has the shape of a pyramid wherein the anodes are positioned at the four corners of the base and the cathodes are located at the apex.

A direct current electrical potential is connected between the anodes and cathodes. The current and voltage levels are chosen to remove the greatest amount of water from the aqueous dispersion of solids at the least power costs.

Theory dictates that an electrical field with a constant potential gradient should be optimum. However, in large impoundments the desired gradient is impossible to achieve and relatively large potential drops are suffered near the cathode and anodes. To smooth the potential gradient the second cathode means is added between the central cathode and the anodes. It is found that the measured field resistance of the aqueous dispersion is much more dependent upon the cathode area than the anode area when an anode rich system is used.

Several factors dictate the need for an anode rich system. One factor is that in the impoundments water moves toward the cathode. It is desirable to move the water toward a central location where it can escape relatively rapidly from the aqueous dispersion and be easily removed from the impoundment. Thus, a greater number of anodes are required surrounding a central cathode system. Additionally, the anodes are consumed electrochemically as predicted by Faraday's law.

$$\text{(anode)} \quad Fe \rightarrow Fe^{+2} + 2e^-$$
$$\underline{\text{(cathode)} \quad H_2O + 2e^- \rightarrow O^{-2} + H_2}$$
$$Fe + H_2O + 2e^- \rightarrow FeO + H_2 + 2e^-$$

Faraday's law states that one gram equivalent of metal will corrode for each 96,500 ampere-seconds, or, in other words, 56/2 = 28 grams of iron will corrode for each 96,500 ampere-seconds of electricity consumed. It is, therefore, required that the mass of the anodes be large compared to that of the cathodes. The cathodes do not corrode because they are held at a high negative potential. It is the amperage, not potential, which consumes anodes and by adjusting the surface area of the cathodes the field resistance of the aqueous dispersion, and the corresponding amperage-voltage relationship, may be varied over large limits.

In the practice of the present invention various auxiliary techniques can be employed, if desired. For example, electrolyte can be added to the aqueous dispersion to increase the conductivity thereof or electrode cooling means can be provided to remove excess heat to prevent the complete drying of the material adjacent the anodes.

The drying of the aqueous dispersion surrounding the anodes, and the resulting buildup of solids on the anode, is one of the major problems encountered when using the techniques of this invention. To prevent the complete drying of the material surrounding the anode, a gas or liquid may be bubbled through the aqueous dispersion adjacent the anode. A more practical solution requires the periodic reversal of the electrical potential between the anodes and cathodes for a short period of time to cause migration of the liquid within the aqueous dispersion toward the anodes instead of toward the cathodes. However, reversal of the electrical potential causes rapid disintegration of cathodes which are relatively light in weight compared to the anodes. To prevent disintegration of the cathodes a second anode may advantageously be installed beneath the central cathode. When the polarity of the electrical potential is reversed, the cathodes are electrically removed from the circuit and the second anode is connected in their place so that the second anode disintegrates rather than the cathodes.

This invention may also be utilized when the dispersed particles within the aqueous dispersion are characterized as having a positive electrical charge in relation to ground zero. All parameters of the foregoing disquisition of aqueous dispersions containing negatively charged particles equally apply when the particles have a positive charge except that the positions of the anodes and cathodes must be reversed. To cause migration of water toward a central location, the anodes, rather than cathodes as discussed above, must be located at the center of the electrode system. Referring to FIG. III, in an aqueous dispersion, a first anode means 1 is surrounded by concentric circles of the plurality of anodes forming a second anode means and the plurality of cathodes forming the cathode means 3.

By the use of this invention, water is separated from the solids and brought to the upper surface of an aqueous dispersion where it may be removed and the solids are more rapidly compacted than by natural settlement. Thus, the volume of aqueous dispersion of solids which can be accepted by the impoundment within any time span is increased over that volume which can be accepted by the impoundment if settling is accomplished solely by natural means. Similarly, the more rapid settling of the solids caused by this invention more rapidly restores the impoundment to an acceptable habitat for aquatic life.

As various changes could be made in the method and apparatus herein described without departing from the scope of the invention, it is intended that all matter contained in the above description shall be interpreted as illustrative and not in a limiting sense.

What is claimed is:

1. A process for removing water from an aqueous dispersion of solids which have a negative electrical charge in relation to ground zero via electroendosmosis comprising:
    mounting a first cathode means in said aqueous dispersions,
    mounting an anode means in said aqueous dispersion separated from said first cathode means,
    mounting a second cathode means in said aqueous dispersion intermediate said first cathode means and said anode means and closer to said first cathode means than said anode means,
    establishing a direct current electrical potential between said first and second cathode means and said anode means wherein the water in said aqueous dispersion of solids is moved toward said first and second cathode means whereby said water may be removed and said solids remain.

2. The process of claim 1 including:
    mounting said second cathode means intermediate said first cathode means and said anode means wherein no 5 percent of the linear distance between said first cathode means and said anode means exhibits a voltage drop greater than 30 percent of the total voltage drop between said first cathode means and said anode means.

3. A process for removing water from an aqueous dispersion of solids which have a positive electrical charge in relation to ground zero via electroendosmosis comprising:
    mounting a first anode means in said aqueous dispersions,
    mounting a cathode means in said aqueous dispersion separated from said first anode means,
    mounting a second anode means in said aqueous dispersion intermediate said first anode means and said cathode means and closer to said first anode means than said cathode means,
    establishing a direct current electrical potential between said first and second anode means and said cathode means wherein the water in said aqueous dispersion of solids is moved toward said first and second anode means whereby said water may be removed and said solids remain.

4. The process of claim 3 including:
    mounting said second anode means intermediate said first anode means and said cathode means wherein no 5 percent of the linear distance between said first anode means and said cathode means exhibits a voltage drop greater than 30 percent of the total voltage drop between said first anode means and said cathode means.

5. A process for increasing the zonal concentration of solids having a negative electrical potential in relation to ground zero in an aqueous dispersion thereof, said method comprising:

providing in said dispersion a first cathode means, an anode means spaced from said first cathode means, and a second cathode means disposed in a plane perpendicularly transversing the plane between said first cathode means and said anode means, and closer to said first cathode means than to said anode means, establishing an electrical potential between said anode means and said first and second cathode means sufficient to effect preferential migration of water in said dispersion toward said first and second cathode means, separating said first cathode means and said anode means by a distance such that if said first cathode means and said second cathode means were located at the same distance from said anode means and closely adjacent, that some 5% of the linear distance between said combined first and second cathode means and said anode means would exhibit a voltage drop greater than 30% of the total voltage drop between said first cathode means and said anode means, and disposing said second cathode means in a position such that no 5% of the linear distance between said first cathode means and said anode means exhibits a voltage drop greater than 30% of the total voltage drop between said first cathode means and said anode means.

6. The process of claim 5, including:
separating said first cathode means and said anode means by a distance of at least 6 meters.

7. The process of claim 6, including:
disposing a plurality of second cathode means circumferentially around said first cathode means, and
disposing a plurality of anode means circumferentially around said first and second cathode means.

8. A process for increasing the zonal concentration of solids having a positive electrical potential in relation to ground zero in an aqueous dispersion thereof, said method comprising:

providing in said dispersion a first anode means, a cathode means spaced from said first anode means, and a second anode means disposed in a plane perpendicularly transversing the plane between said first anode means and said cathode means, and closer to said first anode means than to said cathode means, establishing an electrical potential between said first and second anode means and said cathode means sufficient to effect preferential migration of water in said dispersion toward said first and second anode means, separating said first anode means and said cathode means by a distance such that if said first anode means and said second anode means were located at the same distance from said cathode means and closely adjacent, that some 5% of the linear distance between said combined first and second anode means and said cathode means would exhibit a voltage drop greater than 30% of the total voltage drop between said first anode means and said cathode means, and disposing said second anode means in a position such that no 5% of the linear distance between said first anode means and said cathode means exhibits a voltage drop greater than 30% of the total voltage drop between said first anode means and said cathode means.

9. The process of claim 8, including:
separating said first anode means and said cathode means by a distance of at least 6 meters.

10. The process of claim 9, including:
disposing a plurality of second anode means circumferentially around said first anode means, and
disposing a plurality of cathode means circumferentially around said first and second anode means.

11. A process for removing water from an aqueous dispersion of solids which have an electrical charge in relation to ground zero via electroendosmosis comprising:

mounting a first electrode means in said aqueous dispersions, mounting a third electrode means in said aqueous dispersion separated from said first electrode means, mounting a second electrode means in said aqueous dispersion intermediate said first electrode means and said third electrode means and closer to said first electrode means than said third electrode means, establishing a direct current electrical potential between said first and second electrode means and said third electrode means wherein the water in said aqueous dispersion of solids is moved toward said first and second electrode means whereby said water may be removed and said solids remain.

* * * * *